July 11, 1933.  H. B. INGLIS ET AL  1,917,974
FLOW METER
Filed March 25, 1930
Fig. 1
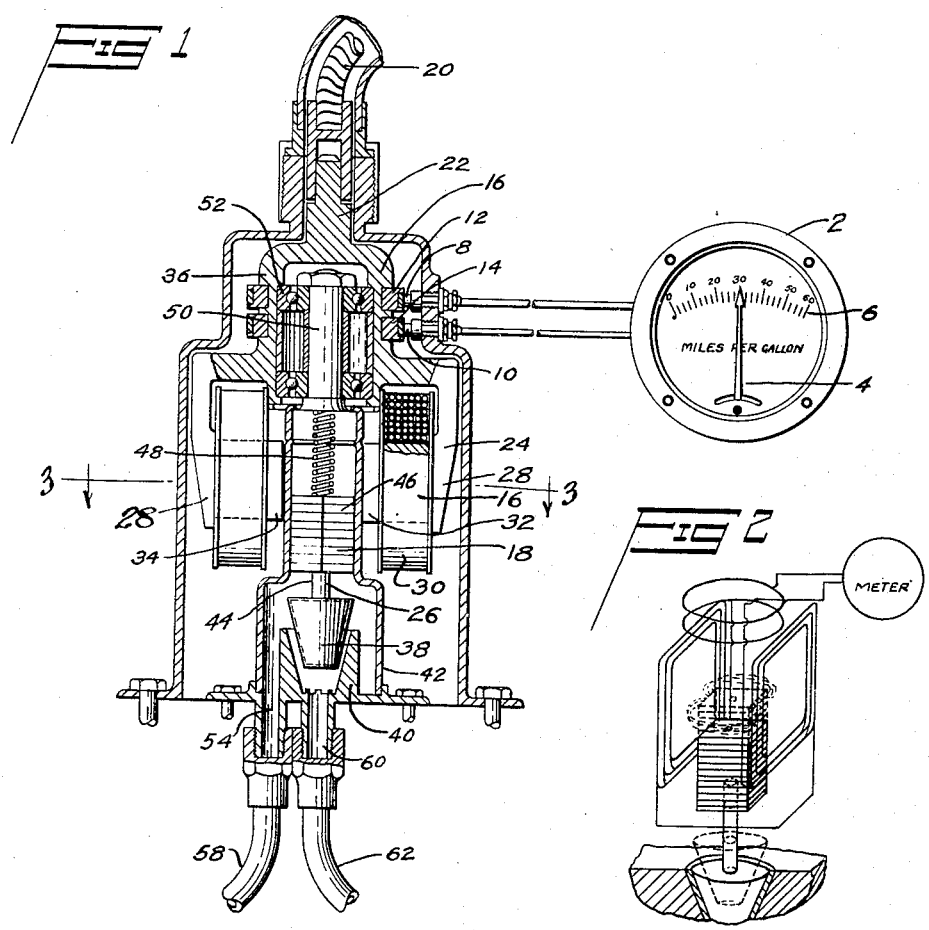
Fig. 2
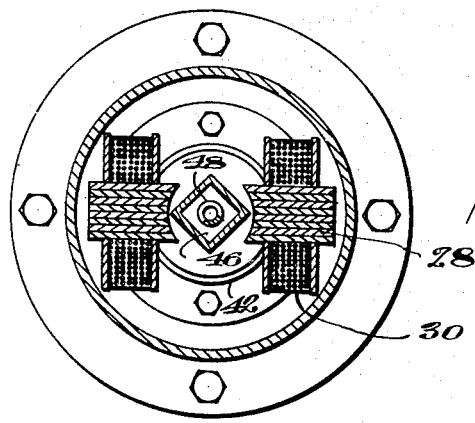
Fig. 3
INVENTORS
Henry B. Inglis - Robert Kauch
BY  & Charles L. Paulus.
Robert N. Young
ATTORNEY Patented July 11, 1933

1,917,974

UNITED STATES PATENT OFFICE

HENRY B. INGLIS, OF BROOKLYN, NEW YORK, AND CHARLES L. PAULUS AND ROBERT KAUCH, OF DAYTON, OHIO

FLOW METER

Application filed March 25, 1930. Serial No. 438,852.

The present invention relates to indicators and indicating devices and more particularly to devices for indicating the relation between the operation of operable devices and the energy consumed in operating the same.

More in particular my invention relates to indicators for indicating the relation between the speed of motor vehicles and the rate of fuel consumed in propelling the same. Motor vehicle indicators of the above designated character enable the operator to determine whether the vehicle is operating at the desired efficiency. Those heretofore proposed have been unsatisfactory because the indications of the intermittent type of indicator left the operator entirely in the dark as to the efficiency of the vehicle during the periods of time between successive indications of the indicator; and the continuous type of indicator gave the operator an indication which was not accurate at periodic intervals of time, while the device was in operation.

It is, therefore, an object of this invention to provide an indicator which shall continuously and accurately indicate the instantaneous value of the relation between the operation of operable devices and the energy consumed in operating the same. With this and other objects in view, as will appear in the subjoined description taken in connection with the accompanying drawing, the invention consists of the improved indicator hereinafter described and defined in the appended claims.

In the accompanying drawing:

Fig. 1 is a vertical cross sectional view of the preferred form of the invention.

Fig. 2 is a diagrammatic view, and

Fig. 3 is a sectional view taken on the line 3—3 of Fig. 1.

The preferred embodiment of my invention is diagrammatically illustrated in Fig. 1 in which an electric meter 2 is shown and used to indicate the operation of an airplane or automobile engine in terms of miles per gallon. The electric meter 2, which is provided, may be a commercial voltmeter with a hand 4 normally positioned at the 0 reading of a scale 6 that is graduated to read miles per gallon. The position of the hand 4 relative to the scale 6 will depend upon the amount of current passing through the voltmeter which is connected in circuit with a pair of brushes 8, 10, that are in electrical contact with a pair of collector-rings 12, 14 respectively of a rotating armature 16 that is controlled by a windvane on an airplane (not shown) or by the wheel of a vehicle (not shown). The amount of voltage generated by the rotating armature 16 will depend upon the rate of rotation of the armature as indicated in the present instance by the rate of movement of the vehicle and its relative position with respect to the permanent magnet 18 that is moved axially of the armature 16 and controlled by the rate of energy consumed as indicated in the present instance by the rate of fuel consumed in propelling the vehicle. The relative positions of the armature 16 and permanent magnet 18 being controlled in accordance with the rate of movement of the vehicle and the rate of consumption of the fuel, the voltage generated will be dependent upon these factors and the hand 4 will indicate the value in miles per gallon.

The armature 16 may be operated from a wheel shaft (not shown) or other movable part of the motor vehicle or to a windvane attached to an airplane (not shown) to which it may be connected by a flexible shaft 20. The flexible shaft is adapted to transmit motion to a shaft 22 made integral with the armature 16 that is adapted to rotate in a magnetic field comprising a yoke-shaped housing 24 adapted to partially enclose a float device 26. Each arm 28 of the yoke-shaped housing 24 carries a coil 30 and is L-shaped in vertical cross section, the base portions of each arm 28 presenting inwardly and forming the pole faces 32, 34 of the armature. The voltage induced in the armature is led through the pair of collector rings 12, 14 that are mounted on the neck 36 of the housing 24 and through the brushes 8, 10 that are in contact with the collector rings 12, 14 respectively and in electrical communication with the voltmeter that may be remote from the metering apparatus, for example, it may be mounted on the dash board of an automobile or an airplane.

The float device 26 comprises a frustro-conical float member 38 disposed within a complementary float chamber 40 that is enclosed within the housing 42. The float member has a stem 44 secured thereto upon which is fixedly mounted a plurality of permanent magnets 46 which are guided by the walls of the housing 42 and are yieldingly urged toward the frustro-conical chamber by a coil spring 48 disposed between the upper end of the housing and the magnets. The pressure exerted by the weight of the float member 38 and the tension of the spring 48 is directly proportional to the pressure of the fuel passing through the float chamber at any instant.

The intensity of the voltage generated will depend upon the rotary speed of the armature and the relative position of the armature and permanent magnets. A change in the relationship of the armature and permanent magnets either by reason of relative speed or relative position will give a corresponding change in the indication of the voltmeter.

When the vehicle is moving and the motor is at rest the armature is rotating about a substantially 0 magnetic field and consequently no voltage is generated. Conversely no voltage is generated when the vehicle is at rest and the motor is operating. It is only when both the vehicle and motor are in operation that a voltage is generated.

The housing 42 completely encloses the float chamber 40, float member 38, permanent magnets 46 and coil spring 48. This housing is provided with a shaft 50 at its upper end to receive a journal bearing 52 for the armature and is connected at its lower end by a pipe 54 to a passage 58 to permit the fuel flowing through the chamber 40, that is connected at its lower end by a pipe 60, to a passage 62 leading from a fuel tank (not shown) to flow to a carbureter (not shown).

The flow of liquid fuel through the chamber 40 past the conical float 38 will cause a pressure against the float that will vary in accordance with the rate of flow of fuel through the chamber. As the rate of flow of the fuel is varied, the fuel pressure in the chamber will vary with a corresponding variation in the position of magnets that are moved by the pressure exerted on the float. Thus the rate of flow through the chamber will control the position of the float and consequently the position of the magnets will depend ultimately upon the rate of consumption of the fuel by the engine and will determine the intensity of the magnetic field and its influence upon the armature.

Similarly the speed of the armature is a measure, at any instant, of the speed of the vehicle and determines the voltage thereby determining the force exerted on the hand. It will be seen that the hand will be actuated over the scale in accordance with the value of the resultant voltage of the armature rotating in the magnetic field and that the resultant voltage will depend upon the speed of the armature and the position of magnet relative thereto.

It will, of course, be obvious that, if as heretofore stated this indicator is intended to enable the operator to determine whether the vehicle is operating at the desired efficiency, there will be a predetermined position of the magnets 18 as a result of a given flow and a predetermined speed of rotation of the armature, both the position of the magnets and the speed of the armature corresponding to the desired efficiency. The correct position of the magnets with respect to the core 16 is a matter of experiment and can readily be determined by those skilled in the art. The magnets 18 should be positioned so that at the desired efficiency the maximum voltage is obtained and any change in speed of armature or flow of fuel will effect a decrease in the voltage reading.

While we have shown one embodiment of our invention, it will be obvious to those skilled in the art that various embodiments as well as changes in the arrangement of parts thereof may be made without departing from the spirit of our invention and therefore, we do not wish to be limited to the above disclosure except as may be required by the claims.

What we claim is:

1. In a device of the class described a rotatable inductance coil controlled in accordance with the speed of an operable device, flux-producing means concentrically disposed with respect to said coil and movable along the common axis thereof in accordance with the rate of fuel consumed by said operable device for producing a variable magnetic field, said coil being in inductive relation with said flux-producing means for effecting a voltage which corresponds to the instantaneous relation of the speed of the operable device and the fuel consumed in operating the same, and means for visibly continuously indicating said relation.

2. In a device of the class described, a rotating armature coil controlled in accordance with the speed of an operable device, a permanent magnet controlled in accordance with the rate of fuel consumed by said operable device, said coil surrounding said magnet and being in inductive relation therewith for effecting a voltage to correspond to the instantaneous relation of speed of the operable device and of the fuel consumed in operating the same and means visibly and continuously indicating said relation.

3. In a device of the class described electrical apparatus for effecting a voltage corresponding to the instantaneous relation between the speed of an operable member and the rate of fuel consumed in operating the same, said apparatus comprising a coil and a means of producing a magnetic field movable linearly relative to each other, one of said members being responsive to variations in the speed of said operable member, the other of said members being responsive to the rate of fuel consumed by said operable member and means actuated by said voltage for visibly indicating said relation.

In testimony whereof we affix our signatures.

HENRY B. INGLIS.
CHARLES L. PAULUS.
ROBERT KAUCH.